(12) United States Patent
Matsuda et al.

(10) Patent No.: US 9,481,208 B2
(45) Date of Patent: Nov. 1, 2016

(54) TIRE

(71) Applicant: The Yokohama Rubber Company, Limited, Tokyo (JP)

(72) Inventors: Jun Matsuda, Kanagawa (JP); Yoshiaki Hashimura, Kanagawa (JP); Yasunobu Seki, Kanagawa (JP)

(73) Assignee: The Yokohama Rubber Company, Limited, Tokyo (JP)

( * ) Notice: Subject to any disclaimer, the term of this patent is extended or adjusted under 35 U.S.C. 154(b) by 72 days.

(21) Appl. No.: 14/402,546

(22) PCT Filed: Apr. 21, 2013

(86) PCT No.: PCT/JP2013/061690
§ 371 (c)(1),
(2) Date: Nov. 20, 2014

(87) PCT Pub. No.: WO2013/175914
PCT Pub. Date: Nov. 28, 2013

(65) Prior Publication Data
US 2015/0136286 A1    May 21, 2015

(30) Foreign Application Priority Data

May 24, 2012    (JP) .................................. 2012-119103

(51) Int. Cl.
*B60C 7/12*    (2006.01)
*B60C 7/14*    (2006.01)

(52) U.S. Cl.
CPC .................. *B60C 7/125* (2013.01); *B60C 7/14* (2013.01); *B60C 2007/146* (2013.04)

(58) Field of Classification Search
CPC ........... B60C 7/10; B60C 7/102; B60C 7/12; B60C 7/125; B60C 7/14; B60C 2007/107; B60C 2007/146
See application file for complete search history.

(56) References Cited

U.S. PATENT DOCUMENTS 1,233,143 A  *  7/1917  Teresa ....................... B60C 5/24
                                                          152/166
1,334,204 A  *  3/1920  Williams ................... B60C 7/12
                                                          152/312

(Continued)

FOREIGN PATENT DOCUMENTS

JP    2005500932 T2    1/2005
JP      3966895 B1     8/2007

(Continued)

OTHER PUBLICATIONS

International Search Report dated Jul. 16, 2013 filed in PCT/JP2013/061690.

*Primary Examiner* — Kip T Kotter
(74) *Attorney, Agent, or Firm* — Rankin, Hill & Clark LLP (57) ABSTRACT

A tire according to an embodiment of the present invention specifically has the annular inner ring band and the annular outer ring band separated from and concentric with the inner ring band, on the outer peripheral side of the wheel, and includes an air bag between the inner ring band and the outer ring band, the air bag including the air intake/discharge mechanism that communicates with the outside. A support body for coupling the inner ring band and the outer ring band is included. A plurality of the air bags is present in a peripheral direction of the tire. Furthermore, the outer ring band, is formed of a rubber composition for a tire. An air discharge hole of the air bag communicates with an outer most layer of the outer ring band. With this configuration, the tire that has advantages of both of a non-pneumatic tire and a pneumatic tire is realized.

8 Claims, 9 Drawing Sheets

(56) References Cited

U.S. PATENT DOCUMENTS

| | | | | |
|---|---|---|---|---|
| 1,909,907 | A | * | 5/1933 | Spiridi ............... B60B 9/10 152/30 |
| 5,685,925 | A | * | 11/1997 | Riquier ............... B60C 7/08 152/157 |
| 6,050,312 | A | * | 4/2000 | Hsu ............... B60C 5/04 152/157 |
| 7,143,797 | B2 | * | 12/2006 | Vannan ............... B60C 7/10 152/11 |
| 8,113,253 | B2 | * | 2/2012 | Arakawa ............... B60B 9/10 152/11 |
| 2004/0159385 | A1 | | 8/2004 | Rhyne |
| 2008/0053586 | A1 | | 3/2008 | Kuramochi |
| 2009/0211674 | A1 | * | 8/2009 | Hanada ............... B60C 7/12 152/53 |

FOREIGN PATENT DOCUMENTS

| | | |
|---|---|---|
| JP | 2009173044 A2 | 8/2009 |
| JP | 2009173045 A2 | 8/2009 |
| JP | 2009173046 A2 | 8/2009 |
| JP | 2010137648 A2 | 6/2010 |
| JP | 2011183894 A2 | 9/2011 |
| WO | 03018332 A1 | 3/2003 |

* cited by examiner

TIRE

TECHNICAL FIELD

The present invention, relates to a tire having a support structure for supporting a load from a vehicle.

BACKGROUND ART

A pneumatic tire has excellent abilities to support a load of a vehicle, to absorb and attenuate an impact from a road surface, and to transfer a force from, the vehicle. Thus, the pneumatic tire is widely used in small and large vehicles, such as bicycles, motorcycles, passenger vehicles, and trucks. However, a puncture caused by a foreign object from a road surface or the like may occur. Thus, in recent years, particularly, there is proposed a non-pneumatic tire having advantages of puncture less and the like The non-pneumatic tires typically used in industrial vehicles include solid-rubber structure tires, such as solid tires and cushion tires. However, there are problems in the non-pneumatic tire having solid-rubber structure that the tire is heavy in weight and the impact-absorbing performance is not high. Thus, the non-pneumatic tire having solid-rubber structure has been hardly used in passenger vehicles emphasized on the riding comfort performance thereof.

Hence, there is proposed a non-pneumatic tire having no solid-rubber structure. This non-pneumatic tire includes: a ring band coaxially disposed on an outer side of a wheel with a clearance; a tread portion for covering an outer periphery of the ring band and contacting a road surface; and a plurality of web spokes for coupling the ring band with the wheel and supporting them while having a tension to transfer a load (Patent Document 1).

CITATION LIST

Patent Literatures

Patent Document 1: JP-T-2005-500932
Patent Document 2: Japanese Patent No. 3966895

SUMMARY OF INVENTION

Problems to be Solved by the Invention

In such a non-pneumatic tire having no solid-rubber structure, a relatively large space is present between the peripherally adjacent web spokes. Thus, the grounding part of the non-pneumatic tire causes uneven contact with the ground (a so-called buckling (buckling) phenomenon), thereby vibration, is generated during traveling. The tire therefore generates facilitating deformation of the tread portion. As a result, the rolling resistance is increased. As a means for preventing such a buckling phenomenon, for example, it has been suggested to suppress buckling of a spoke structure by dividing the spoke structure into pieces in a tire-width direction and displacing fins in these divided pieces with respect to each other (Patent Document 2). This method may prevent the spoke structure from being buckled to a certain extent. However, a fact remains that the spoke structure has a relatively large space between the paired fins adjacent to each other in the peripheral direction. Thus, the spoke structure does not always exert a sufficient buckling suppression effect. In addition, a method for increasing the number of the web spokes as support bodies and making them dense may make the rigidity of the tire less varied.

Furthermore, the occurrence of the buckling may be reduced. However, it results in a problem of an increase in weight of the tire.

Solutions to the Problems

The non-pneumatic tire has punctureless and air maintenance free as its advantageous features. Whereas an advantageous feature of the pneumatic tire is the possible even support of a contact surface with the road surface by compressed air. The present invention has combined their advantage features with each other, thereby solving the above program, such as buckling. In other words, a characteristic feature of the present invention is the presence of a plurality of air bags between an annular inner ring band attached to a tire wheel and an outer ring band supported by a support body. Furthermore, each of these air bags in the tire of the present invention includes an air intake/discharge mechanism communicated with the outside. These air bags are configured to automatically repeat air intake/discharge with rolling of the tire.

More specifically, the outer ring band is flattened when a region thereof contacting the road surface receives an overall weight of an automobile. The air inside the air bag disposed at this portion is correspondingly discharged through a vent hole. As a result, the air bag flattens along the shape of the outer ring band. The rotation of the tire makes the flattened region separate from the road surface, and then initiates the restoration of the outer ring band, to an original, annular state thereof. The air bag correspondingly intakes air through the vent hole. Then, the air bag starts to blow up. In other words, the air bag starts to return to a normal blown-up state. Furthermore, these regions come to the vicinity of an uppermost portion due to the rotation of the tire. Then, the original states are restored completely. That is, the outer ring band is brought into the annular state, and the air bag is brought into a completely blown-up state. These states are repeated in conjunction with the rotation of the tire.

A tire according to the present invention specifically has the annular inner ring band and the annular outer ring band separated from and concentric with the inner ring band, on the outer peripheral side of the wheel. A characteristic feature of the above tire is to include the air bag between the inner ring band and the outer ring band, the air bag including the air intake/discharge mechanism that communicates with the outside. A support body for coupling the inner ring band and the outer ring band is included. A plurality of the air bags is present in a peripheral direction of the tire. Furthermore, the outer ring band is formed of a rubber composition for a tire.

Effects of the Invention

In the conventional non-pneumatic tire having a support body (spoke) structure, a portion of a contact surface with the road surface, in which the support body is not present, is deflected. As a result, contact with the road surface becomes uneven in conjunction with a position of the support body. On the other band, in the tire of the present invention, a portion in which the support body is not present is supported by the air bag. Thus, contact with the road surface becomes even, thereby preventing vibration from being generated by the rolling of the tire. Furthermore, the rolling resistance is not increased. Thus, the ride comfort performance becomes favorable. Moreover, deformation of the support body is appropriately suppressed by the air bag. Thus, the tread is not deformed more than necessary. As a result, an appropriate contact area can be secured. Also from this point, the rolling resistance of the tire is not increased to prevent the support body from being significantly deformed. Thus, anti-fatigue performance of the support body is improved. As a result, a service life of the tire is extended. Furthermore, the air bag lighter than the support body is used together to avoid the need of increasing the number of support bodies more than necessary. Thus, the weight of the tire is not increased. In addition, the plurality of air bags is used. Thus, even, when one of the air bags is damaged, the other air bags in the vicinity can cover the damage. As a result, a run-flat travel is possible to a certain extent.

As described above, the tire according to the present invention combines a property of resistance over a puncture, which is the advantage of the non-pneumatic tire, and properties of favorable ride comfort and low rolling resistance, which are the advantages of the pneumatic tire. Furthermore, this tire has such a superior effect that the weight of the tire is not increased.

The purpose, features, aspects, and advantages of the present invention will further be clarified by the detailed description, which will be made below; and the accompanying drawings.

DESCRIPTION OF EMBODIMENTS

Figure 1:
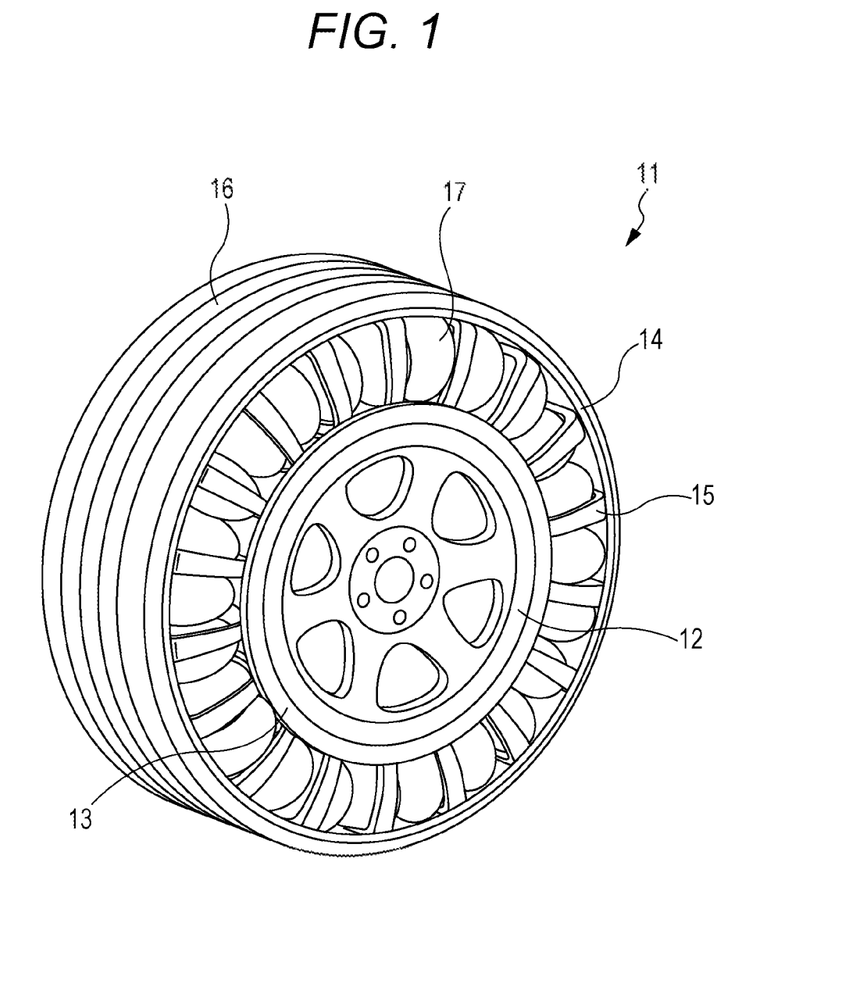
FIG. 1 is a view of an embodiment of a tire that has a spoke structure with an air bag of the present invention.

In the present invention, an air bag is added to the conventional spoke structure that produces an uneven contact state with ground, realizing an even contact state with the ground. Thus, the present invention relates to a tire with which ride comfort and rolling resistance are improved. FIG. 1 is a view of an embodiment of the tire that has the spoke structure with the air bag. A tire 11, which is the spoke structure with the air bag of the present invention, is mounted on a tire wheel 12. The tire 11, which is a spoke structure with the air bag of the present invention, is configured as follows. More specifically, an annular inner ring band 13 is brought into close contact with and fitted to an outer periphery of the tire wheel 12. An annular outer ring band 14 concentric with this inner ring band 13 is separated from the inner ring hand 13. This outer ring band 14 is supported by a support body (spoke) 15 with respect to the inner ring band 13. In addition, an air bag 17 is present between the inner ring band 13 and the outer ring band 14. The inner ring band 13 is in close contact with and fitted to the outer periphery of the tire wheel 12. A tread ring 16 is mounted on an outer periphery of the outer ring band 14. This tread ring 16 contacts the ground. When the outer ring band 14 is formed of a rubber composition for the tire that is the same as a tread, the outer ring band 14 can also serve as the tread ring 16. Alternatively, when the outer ring band and/or the inner ring band is formed of the same material as the support body, the outer ring band and/or the inner ring band can also serve as the support body.

The air bag 17 is arranged between the support bodies 15 that are arranged on both sides in a width direction of the annular inner ring band 13 and outer ring band 14. The air bag 17 contains air when receiving no load. As a result, the air bag 17 is in a blown-up state (normal state). The support body 15 may not only be arranged on the both sides in the width direction of the inner ring band 13 and the outer ring band 14, but may also be arranged in the middle therebetween. In such a case, the air bag 17 is also present between the support bodies 15 that are arranged in the middle. Thus, in this case, a plurality of the plural air bags 17 is present between both side surfaces of the inner ring band 13 and between both side surfaces of the outer ring band 14. In addition, the support body may be also present in the middle between the inner ring band 13 and the outer ring band 14 along a radial direction of the tire. Also, in this case, the plurality of the air bags is present between the inner ring band 13 and the outer ring band 14 in the radial direction of the tire, in FIG. 1, the support body 15 is arranged in a rod shape or a column shape in a substantially perpendicular direction to the inner ring band 13 and the outer ring band 14. However, the support body 15 may be arranged diagonally. Alternatively, the support bodies 15 may be arranged in a mesh shape. Furthermore, the support bodies 15 may be assembled to have a beam structure. In this case, a large number of small, spaces that are divided by the support bodies are formed between the inner ring band 13 and the outer ring baud 14. Corresponding to these small spaces, the air bag may be arranged in each of the small spaces.

The support body may be a mesh-shaped, beam-shaped, rod-shaped, columnar-shaped, or plate-shaped body. When the support body is mesh-shaped, beam-shaped, rod-shaped, or columnar-shaped, the adjacent small spaces are connected to each other. Thus, there is a case where the air bag arranged therein enters the adjacent space when in the blown-up state. When the outer ring band 14 also serves as the tread ring, the outer ring band 14 is formed of the rubber composition for the tire normally used for the tread. When the tread ring covers an outer side of the outer ring band 14, the outer ring band 14 can be formed of the same material as that used for the support body. The outer ring band 14 and the support body 15 can be formed, as an integrated component. When the air bag 17 is blown up, the air bag 17 pushes the outer ring band 14 from an inner side to the outer side. In this way, the air bag 17 also fulfills a role of retaining the annular shape of the outer ring band 14. Noted that, in FIG. 1 and the other figures, the wheel is configured by including the spoke-like support body. However, the wheel may be configured by including another type of the support body (in a spiral-ring shape, for example)

Figure 2:
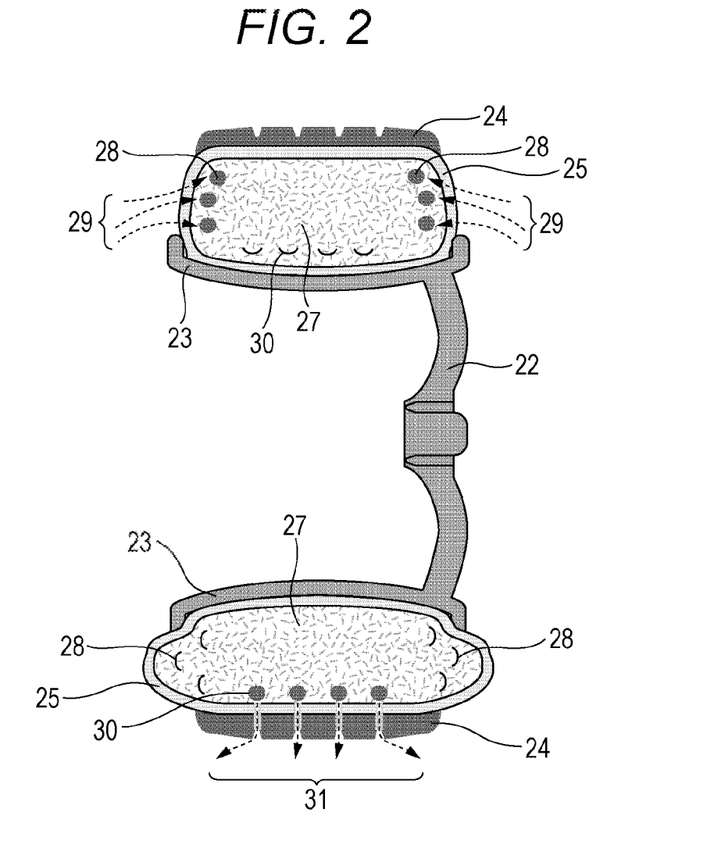
FIG. 2 is a schematic view of a function of the tire configured by including the spoke structure with the air bag of the present invention.

FIG. 2 is a schematic view of a function of the tire configured by including the spoke structure with the air bag of the present invention. A cross section including the center of the wheel is depicted, the cross section being obtained when the tire in a contacting state with the ground is cut in a vertical direction. In FIG. 2, a support body 25 is fitted to a rim 23 that constitutes a wheel 22. However, the wheel 22 may have such a structure that the support body 25 is joined to an inner ring band fitted to a portion of the support body 25 fitted to the rim. As depicted in FIG. 2, the inner ring baud fitted or joined to the rim and the support body may be integrated. A tread 24 is supported on the rim 23 by the support body 25 while being separated, from the rim 23 and concentric with the rim 23. The support bodies 25 are assembled in a lattice shape. The support bodies 25 are arranged between the rim 23 and the tread 24. An air bag 27 is inserted in each of these support bodies, which are arranged in the lattice shape. In FIG. 2, the tread 24 is integrated, with the outer ring band. However, as depicted in FIG. 1, both of them may be separate components. When both of them are the separate components, the outer ring band is present between the support body 25 and the tread 24. Alternatively, an outer diameter side of the support body 25 may be integrated with the outer ring band. In any case, it is necessary that a portion that contacts the road surface has the same function as the tread.

When the tread 24 is positioned on the upper side, no load is applied thereto. Thus, the support body 25 as an elastic body is in a restored state. In addition, an annular state of the tread 24 is retained. At the same time, the air bag 27, which is inserted, in the support body, is restored by a self-restoring force to bring the air bag 27 into the blown-up state. At this time, an air intake opening 28 included in the air bag 27 automatically opens. Thus, air 29 is intaken into the air bag 27 from the external air.

An air discharge opening 30 included in the air bag 27 is in a closed state. Thus, the air inside the air bag 27 is not discharged to the outside, in addition, when a check valve is provided in each of the air intake opening 28 and the air discharge opening 30, the air bag 27 can have such a function that the air reliably flows into only one of them.

A load is applied to the tread 24 on a lower side that contacts the ground. Thus, the support body 25 as the elastic body is deformed. In FIG. 2, the support body 25 is pressed in a width direction of the tire. Meanwhile, the support body 25 is also deformed in the peripheral direction of the tire. In conjunction with the deformation of the support body 25, the air bag 27 is pressed, to the lower side. In this way, the air bag 27 is deformed. Furthermore, the air bag 27 is in contact with an entire inner surface of the tread 24 (except a portion where the support body 25 contacts the tread 24) to make the air bag 27 press the entire inner surface of the tread 24. Thus, a portion where the support body 25 and the tread 24 do not contact each other is also pressed by the air bag 27. This allows the contact surface to be further even. (Without the air bag, contact pressure is brought into an uneven state in this portion.) When the air bag 21 is deformed, the air discharge opening 30 automatically opens. Thus, air 31 inside of the air bag 27 is discharged into the external air. As a result, an impact during; the contact with the ground is absorbed. That is, an impact-absorbing function is improved. Meanwhile, the air intake opening 28 included in the air bag 24 is closed. Thus, the air is not discharged from this air intake opening 28. Especially when the check valve is provided in the air intake opening 28, this effect can further be enhanced. Noted, that the wheel 22 (including the rim 23) cannot deformed by the load. Thus, smooth rotation from an engine gear is transferred to the wheel.

Figure 3:
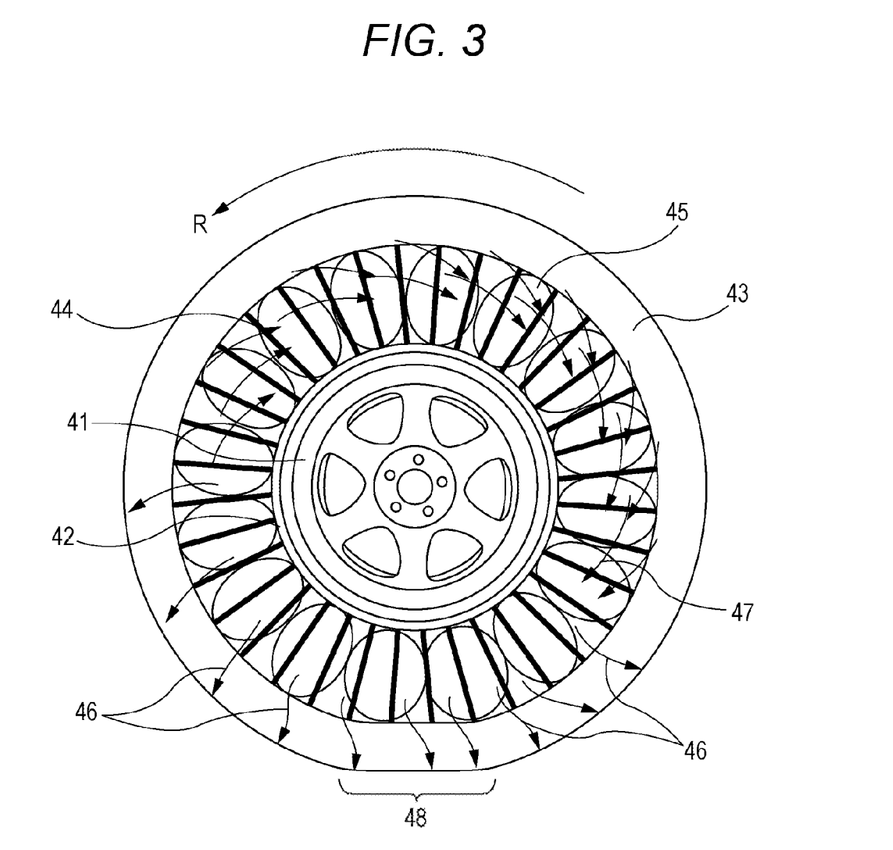
FIG. 3 is a schematic, view of a state of a side surface of the tire of the present invention that rotates while contacting a road surface.

FIG. 3 is a schematic view of a state of a side surface of the tire of the present invention that rotates while contacting the road surface. In the tire in FIG. 3, an inner ring band 42 is mounted on an outer periphery of a wheel 41. An outer ring band 43 supported by a support body 44 and is concentric with the inner ring band 42 is included. An air bag 45 is arranged in the lattice-shaped support bodies between the inner ring band 42 and the outer ring band 43. Similar to FIG. 2, the outer ring band 43 is integrated with the tread ring in FIG. 3. However, the tread ring as a different component may be mounted on the outer ring band 43. The tire rotates in an arrow R direction. A contact region 48 of the outer ring band 43 contacts the ground. In the contact region 48, the support body 44 and the outer ring band 43 are deformed by the load of the automobile. In correspondence with the deformation of these components, the air bag 45 is also deformed.

Due to rotation of the tire, the tire contacts the ground in the contact region 48. Then, the air bag 45 starts being compressed and deformed. This causes an air discharge hole included in the air bag 45 to be opened. Thus, air 46 in the air bag 45 is discharged to the outside. This air discharge hole included in the air bag 45 communicates with the outer ring band 43 or the tread that is an outermost layer, to discharge the air 46 to the outside through a fine through hole provided in the outer ring band or the tread. In this way, the air can be discharged effectively. In addition, with such a configuration, the discharged air assists in sweeping water near the contact surface on a wet road surface, for example. An effect can be therefore exerted that a water draining property is improved, and wet performance is thus improved.

Further rotation of the tire makes the outer ring band 43 separate from the contact region 48, allowing the load of the automobile to be no longer applied to the support body 44 and the outer ring band 43. Due to restoring forces of these elastic bodies, the outer ring band 43 returns to an original state with no load being applied thereto. Thus, the outer ring band 43 is brought into the annular state in the upper side of the tire. In correspondence with this, the air bag 45 is also automatically restored. At the same time, an air intake hole of the air bag 45 automatically opens to intake air 47 into the air bag 45 from the outside. As a result, a state that the air bag 45 is blown up at constant pressure is produced. These are repeated in correspondence with the rotation of the tire. Thus, a contact state of the outer ring band (tread) 43 with the ground is constantly retained to be even. As a result, occurrence of the vibration is reduced. In addition, the deformation of the tread is maintained to be constant. Therefore, favorable rolling resistance can be obtained.

As described above, the air intake/discharge holes 28 and 30 depicted in FIG. 2 include such a mechanism that the air flows only in one direction. In other words, the air intake/discharge holes 28 and 30 each have a check valve mechanism. For example, when the tire is in contact with the ground, the air intake hole 28 is closed. The air intake hole 28 opens when the tire is not in contact with the ground. Thus, the air flows into the inside of the air bag 27. On the other hand, the air discharge hole 30 opens when the tire is in contact with the ground. When the tire does not contact the ground, the air discharge hole 30 is closed. Thus, the air is discharged to the outside from the inside of the air bag 27. As depicted in FIG. 2 and FIG. 3, since the air discharge hole 30 of the air bag 27 communicates with the outer ring band or the tread ring that is the outermost layer, the air inside the air bag 27 can effectively be discharged to the outside.

Figure 4:
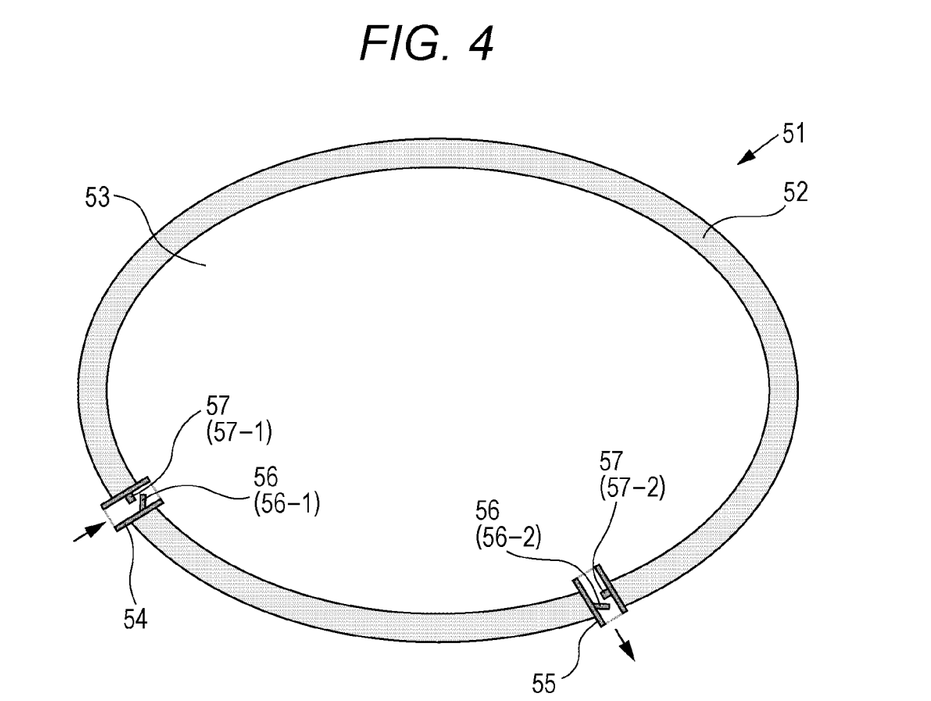
FIG. 4 is a view of an embodiment of a check valve mechanism attached to the air bag.

FIG. 4 is a view of one embodiment of a check valve mechanism attached to an air bag 51. The air bag 51 includes check valves 54 and 55 in a bag wall 52 of the air bag 51. These check valves 54 and 55 are provided with valves 56

(56-1 and 56-2) that are openable and closable by a pressure difference between the inside and the outside and stoppers 57 (57-1 and 57-2). The on-off valve 56 (56-1) opens in the check valve 54 when pressure in an inner space 53 of the air bag 51 becomes lower than pressure on the outside of the air bag 51. Thus, the air in the external air flows into the inner space 53 of the air bag 51. On the contrary, when the pressure in the inner space 53 of the air bag 51 becomes higher than the pressure on the outside of the air bag 51, the on-off valve 56 (56-1) is pressed by the stopper 57 (57-1) to close the on-off valve 56 (56-1). Thus, the air is stopped from flowing in or out. Meanwhile, the check valve 55 operates in an opposite manner from the check valve 54. More specifically, the check valve 55 opens when the pressure in the inner space 53 of the air bag 51 becomes higher than the pressure on the outside of the air bag 51. Thus, the air in the inner space 53 of the air bag 51 flows out to the outside of the air bag 51. On the contrary, when the pressure in the inner space 53 of the air bag 51 becomes lower than, the pressure on the outside of the air bag 51, the on-off valve 56 (56-2) is pressed by the stopper 57 (57-2) to close the on-off valve 56 (56-2). Thus, the air is stopped from flowing in or out. Noted that these check valves 54 and 55 can be provided in arbitrary positions of the air bag 51 as long as the air can flow in and out therethrough. The check valve includes such a simple mechanism. Thus, the check valves 54 and 55 can easily be downsized. In addition, the check valves 54 and 55 can be embedded in the bag wall 52 of the air bag 51. The tire having the spoke structure with the air bag of the present invention can be manufactured only by providing the check valve with such a simple structure in the air bag.

Figure 5:
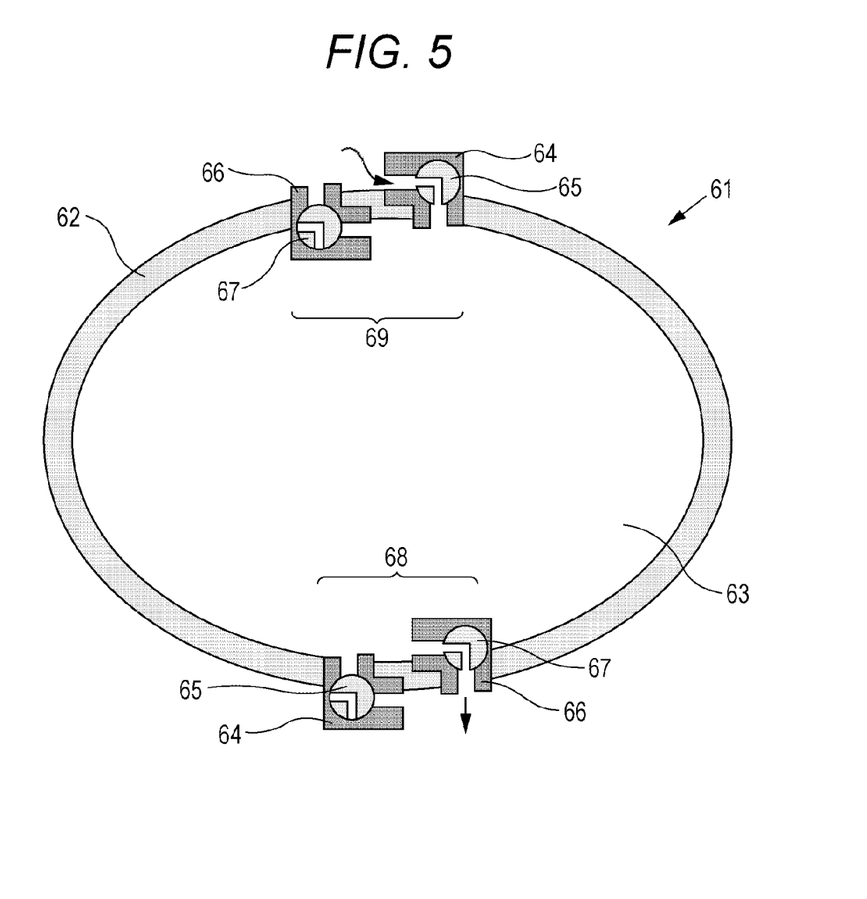
FIG. 5 is a view of another embodiment of a check valve attached to the air bag.

FIG. 5 is a view of another embodiment of a check valve attached to an air bag 61. The air bag 61 includes check valves 64 and 66 in a bag wall 62 of the air bag 61. This check valve 66 includes a rotary ball 67 having a vent passage. Through this vent passage, the air flows in and out between an inner space 63 that contains the air in the air bag 61 and the outside of the air bag 61. This rotary ball 67 is attached such that the rotary ball 67 rotates freely while retaining an airtight state in the check valve 66. The vent passage that the rotary ball 67 has faces a constant direction in accordance with gravity, in other words, the rotary ball 67 retains substantially the same state regardless of where the air bag 61 is positioned. In other words, the rotary ball 67 rotates freely with respect to the check valve 66. However, the rotary ball 67 maintains substantially the same state when seen from the outside.

The air bag 61 attached to the tire rotates together with the rotation of the tire. When the tire rotates, the air bag 61 depicted in FIG. 5 enters a region 68 where the tire contacts the ground. The check valve 66 is arranged in the bag wall 62 of the air bag 61 such that the check valve 66 attached to the air bag 61 also enters this contact region at this time. At this time, as depicted in FIG. 5, a vent passage of the check valve 66 and the vent passage of the rotary ball 67, both of which are located in the contact region 68, are connected as depicted in FIG. 5. Thus, the inner space 63 of the air bag 61 is connected to the outside of the air bag 61. As a result, the air can flow in and out. When the air bag 61 contacts the ground, the air in the inner space 63 of the air bag 61 is discharged to the outside of the air bag 61 through the vent passage of the check valve 66.

Meanwhile, the check valve 64 also includes a rotary ball 65 having a vent passage. Through this vent passage, the air flows in and out between the inner space 63 that contains the air in the air bag 61 and the outside of the air bag 61. This rotary ball 65 is attached such that the rotary ball 65 rotates freely while retaining an airtight state in the check valve 64. The vent passage that the rotary ball 65 has faces a constant direction in accordance with the gravity. In other words, this rotary ball 65 retains substantially the same state regardless of where the air bag 61 is positioned. In other words, the rotary ball 65 rotates freely with respect to the check valve 64. However, the rotary ball 65 maintains substantially the same state when seen from the outside.

The air bag 61 attached to the tire rotates together with the rotation of the tire. When the tire rotates, the air bag 61 depicted in FIG. 5 enters the region 68 where the tire contacts the ground. The check valve 64 is arranged in the bag wall 62 of the air bag 61 such that the check valve 64 attached to the air bag 61 also enters this contact region at this time. At this time, as depicted in FIG. 5, a vent passage of the check valve 64 and the vent passage of the rotary ball 65, both of which are located in the contact region 68, are not connected but blocked. As a result, the air cannot flow in or out between the inner space 63 of the air bag 61 and the outside of the air bag 61.

When the air bag 61 further rotates in correspondence with the rotation of the tire, a portion where the check valves 64 and 66 are present separates from the contact region 68. Then, the directions that the check valves 64 and 66 face also change. Meanwhile, the directions that the rotary balls 65 and 67 face do not change. Thus, the check valves 64 and 66 may also respectively rotate around the rotary balls 65 and 67 to disconnect the vent passage of the check valve 66 from the vent passage of the rotary ball 67. On the other hand, the vent passage of the check valve 64 is connected to the vent passage of the rotary ball 65. In this state, the air bag 61 is restored and thus is blown up. Therefore, the air flows into the inner space 63 of the air bag 61 from the outside of the air bag 61. When the portion where the check valves 64 and 66 are present enters an upper region 69 of the tire, the vent passage of the check valve 64 is completely connected to the vent passage of the rotary ball 65. In this way, the air bag 61 is brought into a sufficiently blown-up state. On the other hand, the vent passage of the check valve 66 is blocked from the vent passage of the rotary ball 67, preventing the air from flowing in or out. Noted that the check valves 64 and 66 can be arranged in any arbitrary position in the air bag 61 as long as the air can flow in and out therethrough. In addition, the check valves 64 and 66 can be downsized. If an amount of the air that flows in and out is small, a plurality of the check valves may be arranged. The air bag, to which the simple check valve that uses the rotary ball having the vent passage as described above is attached, can be applied to the present invention. Here, the check valves 64 and 66 cannot be referred to as check valves in a strict sense. In other words, the air is intaken or discharged in accordance with the internal pressure. Thus, the check valves 64 and 66 can constitute a superior air intake/discharge mechanism that can prevent backflow when being combined with any of the check valves depicted in FIG. 4, FIG. 5, and the other figures.

Figure 6A:
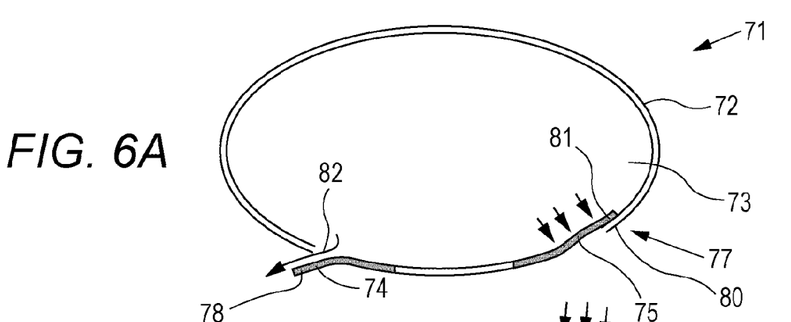
FIG. 6 is a view of yet another embodiment of the check valve attached to the air bag.
Figure 6B:
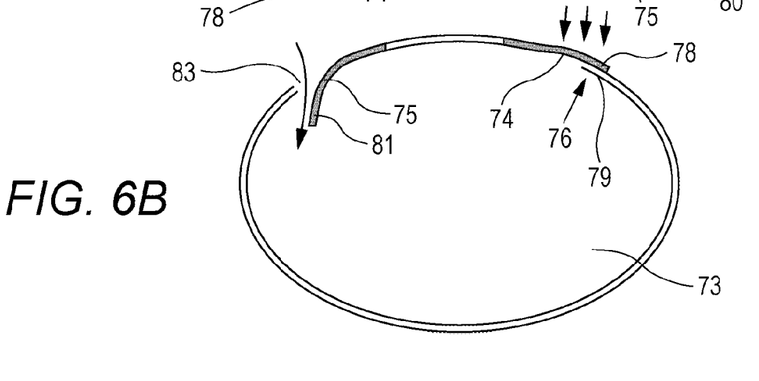

FIG. 6 is a view of a check valve attached to an air bag 71. The air bag 71 includes check valves 74 and 75 in a bag wall 72 of the air bag 71. FIG. 6A is a view of a state that a region where the air bag 71 is present enters a portion of the tire that contacts the ground. FIG. 6B is a view of a state that the region where the air bag 71 is present has separated from the portion of the tire that contacts the ground. Particularly, FIG. 6B is a view of a time when, the air bag 71 depicted in FIG. 6A is located on an opposite side from the portion of the tire that contacts the ground, that is, on the upper side of the tire due to the continuous rotation of the tire. In the check valve 74, a cut is provided in a region 76 of the bag wall 72 of the air bag 71. The bag wall 72 overlaps in this portion 76 to cover an inner bag wall 79 with a bag wall 79 from the outside. The check valve 74 is in a flexible state such that a bag wall 78 on the outside can be opened to and closed from the outside as described above. Meanwhile, in the check valve 75, a cut is provided in a region 77 of the bag wall 72 of the air bag 71. The bag wall 72 overlaps in this portion 77. Thus, an outer bag wall 80 is covered with a bag wall 81 front the inside. The cheek valve 75 is in a flexible state such that the bag wall 81 on the inside can be opened to and closed from the inside as described above.

When the air bag 71 enters the portion of the tire that contacts the ground, the air bag 71 is brought into a compressed state. Thus, pressure of an inner space 73 of the air bag 71 is higher than that on the outside the air bag 71. Therefore, as shown in FIG. 6A, the inner bag wall 81 is pressed from the inside in the check valve 75. This causes the inner bag wall 81 to tightly contact the outer bag wall 80 to prevent the air from flowing in or out. Meanwhile, an outer bag wall 78 is pressed from the inside in the check valve 74 to open the outer bag wall 78 to the outside. In addition, a vent 82 is formed. As a result, the air in the inner space 73 of the air bag 71 is discharged from this vent 82 to the outside of the air bag 71.

When the air bag 71 is located on the upper side of the tire, the air bag 71 is brought into a blown-up state by a self-restoring force. Thus, the pressure of the inner space 73 of the air bag 71 is lower than that on the outside of the air bag 71. Therefore, as shown in FIG. 6B, the outer bag wall 78 is pressed from the outside in the check valve 74. This causes the outer bag wall 78 to tightly contact the inner bag wall 79 to prevent the air from flowing in or out. Meanwhile, the inner bag wall 81 is pressed from the outside in the check valve 75 to open the inner bag wall 81 to the inside. In addition, a vent 83 is formed. As a result, the air on the outside of the air bag 71 flows into the inner space 73 of the air bag 71 from this vent 83. In FIG. 6A, the positions of the check valves are depicted in a lower portion of the air bag. In FIG. 6B, the positions of the check, valves are depicted in an upper portion of the air bag. However, the positions of the check valves are not limited to these positions. The check valves can be provided in arbitrary positions of the air bag as long as the air can flow in and out by opening and closing the check valves.

Figure 7:
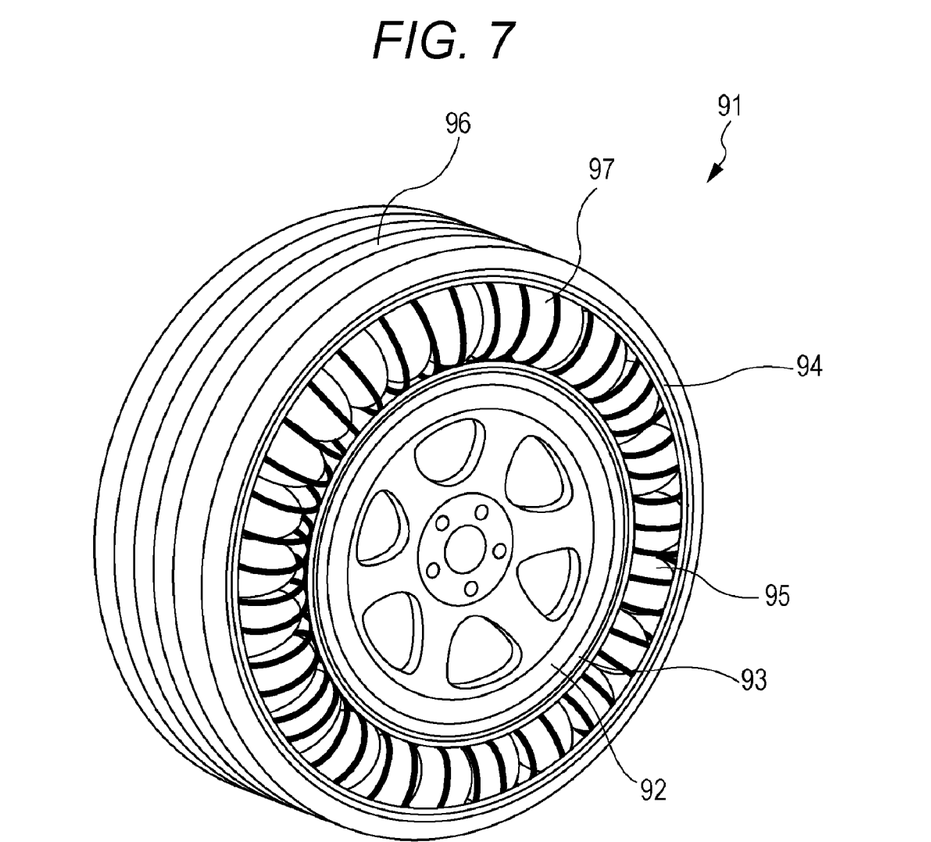
FIG. 7 is a view of an embodiment in which a support body wound in a spiral shape in a peripheral direction of the tire is used.

FIG. 7 is a view of an embodiment in which a support body of spring type (can be also referred to as coil shaped or spring shaped) spiraled in the peripheral direction of the tire is used. The support, body depicted in FIG. 1 is a column-shaped, rod-shape, or plate-shape body that couples the inner ring band and the outer ring band. The support body depicted in FIG. 7 is a spring that is wound while spiraled in the peripheral direction of the tire. A tire 91 as the spoke structure with the air bag of this embodiment is configured as follows. That is, an annular inner ring band 93 is brought into close contact with and fitted to an outer periphery of a tire wheel 92. An annular outer ring band 94 concentric with this inner ring band 93 is separated from the inner ring band 93. This outer ring band 94 is supported by a support body (spoke) 95 with respect to the inner ring band 93. An air bag 97 is present between the inner ring band 93 and the outer ring band 94. In addition, a tread ring 96 is mounted on an outer periphery of the outer ring band 94. The support body 95 is a spring that is wound while being spiraled in the peripheral direction of the tire. The air bag 97 is inserted into the inside of this spring-shaped support body 95. The tire receives the load when the tire contacts the ground. Then, the spring 95 is deflected in the radial direction of the tire. At the same time, the air bag 97 arranged in this portion is also deformed to discharge the inside air. When the tire no longer contacts the ground, the load is not applied thereto. Thus, the spring 95 returns to an original state. Then, a diameter of the spring gradually increases. In correspondence with this, the air bag 97 arranged in this portion is blown up. As a result, the air is intakes into the inside of the air bag from the outside. As a material for the spring, materials such as metal and plastic (resin) can be used. However, metal is preferred. Furthermore, use of a material like spring steel is preferred.

Figure 8:
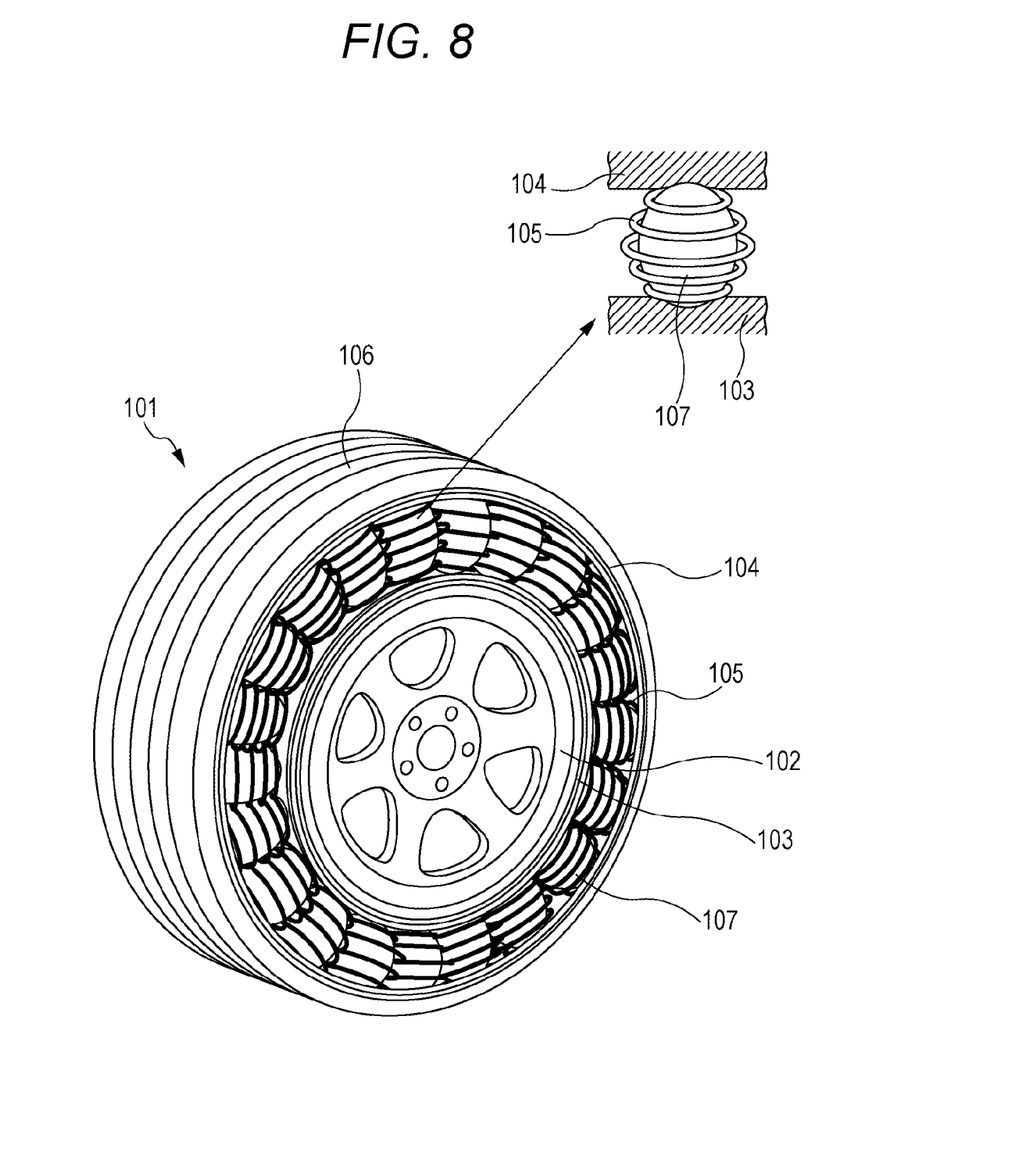
FIG. 8 is a view of an embodiment in which the support, body wound in the spiral shape in a radial direction of the tire.

FIG. 8 is a view of an embodiment in which a support body of spring type spiraled in the radial direction of the tire is used. A tire 101 as the spoke structure with the air bag of this embodiment is configured as follows. That is, an annular inner ring band 103 is brought into close contact with and fitted to an outer periphery of a tire wheel 102. An annular outer ring baud 104 concentric with this inner ring band 103 is separated from the inner ring band 103. This outer ring band 104 is supported by a support body (spoke) 105 with respect to the inner ring band 103. An air bag 107 is present between the inner ring band 103 and the outer ring band 104. In addition, a tread ring 106 is mounted on an outer periphery of the outer ring band 104. The support body 105 is a spring that is wound while being spiraled in the radial direction of the tire. A large number of the springs 105 that are wound in the radial direction of the tire are arranged between the inner ring band 103 and the outer ring band 104. Thus, the outer ring band 104 is supported by the inner ring band 103 via the springs 105. Each of the springs is independent of each other. The air bag 107 is arranged inside this spring. When the tire receives the load by contacting the ground, the spring 105 is compressed in the radial direction of the tire. In correspondence with this, the air bag 107 is also compressed to discharge the inside air. When the tire no longer contacts the ground, the load is not applied thereto. Thus, the spring 105 returns to an original state. Then, the spring is gradually stretched. In correspondence with this, the air bag 107 arranged in this portion is also stretched. As a result, the air is intaken into the inside of the air bag from the outside. As a material for the spring, materials such as metal and plastic (resin) can be used. However, metal is preferred. Furthermore, use of a material like spring steel is preferred.

A material for constituting the support bodies that have been described so far is desirably a material that has sufficient elasticity and also has a stretching property. Furthermore, use of a material with low viscosity is desirable. For example, materials such as metal, polyurethane, and fiber-reinforced plastic (FRP) are preferred. In addition, the air bags are also preferably formed of a material that has elasticity and the stretching property. Materials such as a rubber composition, FRP, and methane are given as examples.

Figure 9:
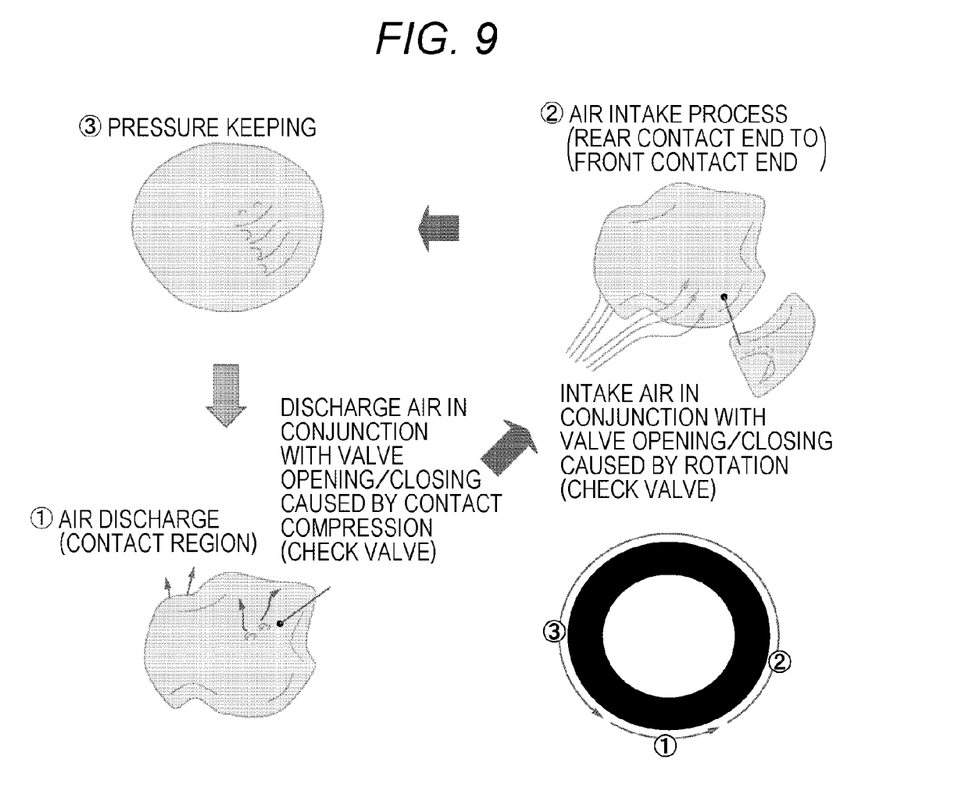
FIG. 9 is a conceptual view of the function of the tire configured by including the spoke structure with the air bag of the present invention.

FIG. 9 is a conceptual view for providing a simple explanation of the above-described present invention. A function of the tire configured by including the spoke structure with the air bag of the present invention is depicted in this conceptual view. When the automobile is at a stop, a portion of the tire that contacts the road surface (a region (1) in FIG. 9) is dented by a weight of a vehicle body. Meanwhile, the opposite side from the contact surface of the tire (a region (3)) is blown up in the annular shape as usual. When the tire rotates in an arrow direction (1)→(2)→(3)→(1)), the tire in a state of (3) (blown up in the annular shape)

is shifted to have the region that contacts the road surface (the region of (1)). At this time, the tire is dented due to the weight of the vehicle body. The support body is also dented. As a result, the air bag is compressed. Thus, the air inside the air bag is discharged to the outside through a vent hole. When the tire further rotates, the contact region (1) is departed therefrom, and thus is shifted to a region where the weight of the vehicle body is not applied (the region of (2)). At this time, the support body starts returning to the original state by the self-restoring force of the support body. In addition, the air bag inside the support body starts being blown up by the self-restoring force. As a result, the outside air is intaken into the air bag through the vent hole. This intake of the air starts from a rear contact end of the tire. The air is intaken until the air bag finishes blown up before the air bag reaches a front contact end. When the tire further rotates, the support body and the air bag are brought into the original blown-up state (a pressure-keeping state) in a region from the rear contact end to the front contact end (the region of (3)) of the tire. When the tire further rotates, the tire enters the contact region. Thus, the above cycle is repeated. As described above, the tire, which is configured by including the spoke structure with the air bag of the present invention, automatically intakes or discharges the air in correspondence with contact rotation of the tire. In this way, denting and blowing of the tire are repeated. Therefore, the rolling resistance can favorably be maintained, and the ride comfort performance can favorably be secured.

Noted that the details that have been described or illustrated in a certain section of the specification can compatibly be applied to another section thereof in which the same description or illustration is not made. Regarding this, it will be obvious that the details can be applied to the other section. In addition, it will be obvious that the details of the embodiment and the examples can be combined and appropriately be adopted and that any of these can be combined with an existing or known technique and can appropriately be adopted. Furthermore, the above-described embodiment is a mere example. Therefore, it will be obvious that various modifications can be made to the present invention without departing from the scope of the gist and that a range of the right of the present invention is not limited to the above embodiment and the examples.

The subject application is based on Japanese Patent Application No. 2012-119103 filed in Japan on May 24, 2012 by the subject applicant. The contents thereof are incorporated herein by reference in its entirety.

INDUSTRIAL APPLICABILITY

The tire of the present invention can be used as an alternative tire for a non-pneumatic tire or a pneumatic tire in various applications.

DESCRIPTION OF REFERENCE SIGNS

11 Tire
12 Tire wheel
13 Inner ring band
14 Outer ring band
15 Support body (spoke)
16 Tread ring
17 Air bag
22 Wheel
23 Rim
24 Tread
25 Support body
27 Air bag
28 Air intake opening
29 Air
30 Air discharge opening
31 Air
41 Wheel
42 inner ring hand
43 Outer ring band
44 Support body
45 Air bag
46 Air
47 Air
48 Contact region
51 Air bag
52 Bag wall
53 Inner space
54 Check valve
55 Check valve
56 On-off valve
57 Stopper
61 Air bag
62 Bag wall
63 Inner space
64 Check valve
65 Rotary ball
66 Check valve
67 Rotary ball
68 Contact region
69 Upper region
71 Air bag
72 Bag wall
73 Inner space
74 Check valve
75 Check valve
78 Bag wall
79 Bag wall
80 Bag wall
81 Bag wall
82 Vent
83 Vent
91 Tire
92 Tire wheel
93 inner ring band
94 Outer ring band
95 Support body (spring)
96 Tread ring
97 Air bag
98 Axle
101 Tire
102 Tire wheel
103 Inner ring band
104 Outer ring band
105 Support body (spring)
106 Tread ring
107 Air bag

The invention claimed is:

1. A tire having an annular inner ring band and an annular outer ring band concentric with and separated from the inner ring band on an outer peripheral side of a wheel, the tire comprising:

an air bag including an air intake/discharge mechanism disposed between the inner ring band and the outer ring band and communicating with outside, wherein a plurality of the air bags is present in a peripheral direction of the tire, and the air intake/discharge mechanism comprises:

an air discharge mechanism which discharges air inside of the air bag into an external air when the air bag is in a contact region and is dented; and an air intake mechanism which intakes air into the air bag from the external air when the air bag is separated from the contact region.

2. The tire according to claim 1, further comprising a support body that couples the inner ring band and the outer ring band.

3. The tire according to claim 2, wherein the outer ring band is formed of a rubber composition for a tire.

4. The tire according to claim 1, wherein the air intake/discharge mechanism comprises a check valve disposed in the air bag.

5. The tire according to claim 1, wherein the outer ring band is formed of a rubber composition for a tire.

6. The tire according to claim 1, further comprising a tread that is integrated with the outer ring band, the tread being an outermost layer of the outer ring band, wherein the air discharge mechanism comprises an air discharge hole which communicates with the tread.

7. The tire according to claim 1, further comprising a tread disposed on an outermost layer of the tire, the tread comprising a through hole on a contact surface of the tire where the tire contacts a ground, wherein the air discharge mechanism comprises an air discharge hole which discharges the air into the external air through the through hole.

8. The tire according to claim 1, wherein the air discharge mechanism and the air intake mechanism are check valves disposed on the air bag, the check valves being different from each other.

\* \* \* \* \*